(12) United States Patent
Johnson et al.

(10) Patent No.: US 11,752,826 B2
(45) Date of Patent: Sep. 12, 2023

(54) SUSPENSION SYSTEM WITH IMPROVED ABILITY TO AVOID GETTING STUCK OR GET UNSTUCK

(71) Applicant: Ford Global Technologies, LLC, Dearborn, MI (US)

(72) Inventors: Matthew Johnson, Toledo, OH (US); Keith Weston, Canton, MI (US); Jonathan Sullivan, Ferndale, MI (US); David Michael Russell, Ann Arbor, MI (US); Rohit Hippalgaonkar, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/670,750

(22) Filed: Feb. 14, 2022

(65) Prior Publication Data
US 2023/0256786 A1    Aug. 17, 2023

(51) Int. Cl.
| | |
|---|---|
| *B60G 17/016* | (2006.01) |
| *B60G 21/10* | (2006.01) |
| *B60G 17/0195* | (2006.01) |
| *B60G 17/052* | (2006.01) |

(52) U.S. Cl.
CPC ....... *B60G 17/016* (2013.01); *B60G 17/0195* (2013.01); *B60G 21/106* (2013.01); *B60G 17/052* (2013.01); *B60G 2202/152* (2013.01); *B60G 2400/204* (2013.01); *B60G 2400/208* (2013.01); *B60G 2400/25* (2013.01); *B60G 2500/10* (2013.01); *B60G 2500/201* (2013.01); *B60G 2600/04* (2013.01); *B60G 2600/16* (2013.01); *B60G 2600/602* (2013.01)

(58) Field of Classification Search
CPC .. B60G 17/016; B60G 17/0195; B60G 21/06; B60G 17/052; B60G 2202/152; B60G 2400/204; B60G 2400/208; B60G 2400/25; B60G 2500/10; B60G 2500/201; B60G 2600/04
See application file for complete search history.

(56) References Cited

U.S. PATENT DOCUMENTS

| | | | |
|---|---|---|---|
| 7,571,044 B2 | 8/2009 | Brown et al. | |
| 9,682,710 B2 * | 6/2017 | Darnell | B60W 10/22 |
| 10,759,433 B2 * | 9/2020 | Falconer | B60W 30/18045 |

(Continued)

FOREIGN PATENT DOCUMENTS

| | | | |
|---|---|---|---|
| JP | 4626438 B2 | 2/2007 | |
| JP | 2016124358 A | 7/2016 | |
| JP | 2016183581 A | * 10/2016 | |

*Primary Examiner* — Drew J Brown
(74) *Attorney, Agent, or Firm* — Burr & Forman LLP; Lorne Forsythe (57) ABSTRACT

A method of controlling a vehicle may include determining a proximity to a stuck condition based on measured vehicle motion parameters and a wheel speed measured by a wheel speed sensor associated with one or more wheels of the vehicle. The method may further include generating a notification to a driver of the vehicle in response to the proximity to the stuck condition indicating that the vehicle is either in a stuck condition or a nearly stuck condition, and responsive to driver selection of an unstuck mode, executing an unstuck algorithm to automatically control operation of the vehicle to achieve a free condition.

19 Claims, 8 Drawing Sheets

(56) References Cited

U.S. PATENT DOCUMENTS

| | | |
|---|---|---|
| 10,981,571 B2 | 4/2021 | Ortmann et al. |
| 2007/0255465 A1* | 11/2007 | Brown ............... B60G 17/0165 |
| | | 701/37 |
| 2015/0203117 A1* | 7/2015 | Kelly .................. F16H 61/0213 |
| | | 701/91 |
| 2020/0130452 A1 | 4/2020 | Rothwell et al. |

* cited by examiner

SUSPENSION SYSTEM WITH IMPROVED ABILITY TO AVOID GETTING STUCK OR GET UNSTUCK

TECHNICAL FIELD

Example embodiments generally relate to vehicle suspension and, more particularly, relate to a suspension system with a capability to transform into an active suspension with individual corners having increased articulation.

BACKGROUND

Vehicles commonly employ independent suspension that allows each wheel to move relative to the vehicle chassis independent of the other wheels. The components and geometries used for independent suspension designs can vary to some degree. However, a typical independent suspension system will employ shock absorbers (or simply "shocks") that are designed to provide damping for heave (i.e. oscillation along the vertical axis of the vehicle) pitch (i.e., oscillation about a lateral axis of the vehicle), roll (i.e., oscillation about a longitudinal axis of the vehicle) and individual wheel disturbances that may be encountered. The shocks generally resist compression and rebound with damping forces that are applied over a range of travel of a piston rod.

The shocks selected for a particular vehicle are generally chosen based on the expectation of normal pitch, roll and individual wheel event scenarios that are encountered during routine driving conditions. Meanwhile, high performance vehicles, or vehicles that are designed to be operated off-road, may encounter higher levels of heave, pitch, roll and wheel events, and may therefore require higher damping forces to allow for the vehicle control required in these environments. Semi-active suspensions have also been developed to enable varying the amount of damping force at any given time to balance needs for more or less damping.

Meanwhile, when a vehicle is getting stuck, or is stuck, the suspension system could potentially play a role in providing automated responses or suggestions that may avoid problems or minimize them in any case. Example embodiments explore options for improving suspension systems in this regard.

BRIEF SUMMARY OF SOME EXAMPLES

In accordance with an example embodiment, a vehicle control system may be provided. The system may include a vehicle sensor assembly measuring vehicle motion parameters, a wheel speed sensor associated with one or more wheels of the vehicle to determine a wheel speed of each of the one or more wheels, and a controller operably coupled to the vehicle sensor assembly and the wheel speed sensor to perform various operations. The operations performed may include determining a proximity to a stuck condition based on the vehicle motion parameters and the wheel speed, generating a notification to a driver of the vehicle in response to the proximity to the stuck condition indicating that the vehicle is either in a stuck condition or a nearly stuck condition, and responsive to driver selection of an unstuck mode, executing an unstuck algorithm to automatically control operation of the vehicle to achieve a free condition.

In another example embodiment, a method of controlling a vehicle may be provided. The method may include determining a proximity to a stuck condition based on measured vehicle motion parameters and a wheel speed measured by a wheel speed sensor associated with one or more wheels of the vehicle. The method may further include generating a notification to a driver of the vehicle in response to the proximity to the stuck condition indicating that the vehicle is either in a stuck condition or a nearly stuck condition, and responsive to driver selection of an unstuck mode, executing an unstuck algorithm to automatically control operation of the vehicle to achieve a free condition.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide an improved suspension system that employs algorithms to detect when a vehicle may be getting stuck and/or to implement strategies to avoid getting stuck or get unstuck. The algorithms may therefore detect certain conditions to inform the user or take automatic action (sometimes responsive to user initiation of a process for getting unstuck). In some embodiments, the conditions detected may include speed parameters (e.g., wheel speed vs. vehicle speed) and suspension position (e.g., via ride height, onboard scales, vertical accelerometers, etc.). As an example, by determining that wheel speed is high for a given vehicle speed, and/or that suspension position at one or more corners of the vehicle may indicate suspension traveling into droop, a proximity to a stuck condition may be determined. Proximity to the stuck condition may be determined based on a current state relative to various ranges defined by corresponding thresholds or dividing points along the span of possible parametric measurements for the parameters measured. The proximity to the stuck condition may, for example, include a free condition where the vehicle is neither stuck nor nearly stuck. The stuck condition may correspond to a situation in which measured parameters indicate that the vehicle is effectively stuck presently. The nearly stuck condition may correspond to a situation in which measured parameters indicate that the vehicle is tending toward the stuck condition.

When proximity to the stuck condition is determined, and the vehicle is not in the free condition (i.e., when the vehicle is either determined to be stuck or nearly stuck), example embodiments may initiate a notification to the user and/or implement various automated responses. In some embodiments, the notification may include instructions or a recommendation to utilize a vehicle freeing algorithm such as an automated cycling algorithm that employs different automated strategies for freeing the vehicle. However, in other embodiments, the notification may also or alternatively indicate that certain automated strategies are being implemented to avoid progressing from the nearly stuck condition to the stuck condition.

In some embodiments, it may further be possible to provide changes to suspension system settings or characteristics to provide useful responses to either being in the stuck condition or the nearly stuck condition. For example, anti-roll bar (ARB) connection or disconnection may be performed, suspension damping force may be increased, spring rate may be reduced (e.g., for vehicles with air springs), and/or the like. Suspension changes may be employed, for example, to keep the wheels of the vehicle from dropping into a hole by adding rebound control that may hold the wheels up against the springs for as long as possible to give the driver and control system time to prevent further digging when a hole begins to be dug. Other situations can similarly be managed by monitoring individual wheels of the vehicle for slippage so that when a particular wheel is slipping, strategies can be employed to attempt to manage or avoid such slippage. In doing so, the basic principle that frictional force (Ff) is equal to the friction coefficient (u) times the normal force (Fn) (i.e., Ff=u*Fn) can be used to employ strategies that may increase the normal force (Fn) at a slipping wheel to thereby also increase frictional force to gain traction and either get unstuck or otherwise avoid getting stuck. This capability may be particularly useful in off road situations such as rock crawling when encountering a rock or boulder that is smooth, or when driving on a beach where sand may be soft and wheels may tend to dig into the sand.

In some embodiments, wheel speed sensors may be employed to detect wheel slip by detecting such slippage based on a comparison of the wheel speed to vehicle speed. Ride height sensors or other wheel position sensors may monitor ride height or suspension position at each respective wheel or corner of the vehicle. In this regard, for example, wheel position sensors may detect wheel position or suspension travel relative to a full range of possible suspension travels that may be achieved at each corner of the vehicle. By detecting proximity to the stuck condition, and parameters that are related to affecting traction at corners of the vehicle, automated algorithms for responding either to the stuck condition or the nearly stuck condition may be implemented to move the vehicle back into the free condition. As a result, vehicle performance and driver satisfaction may also be improved.

Figure 1:
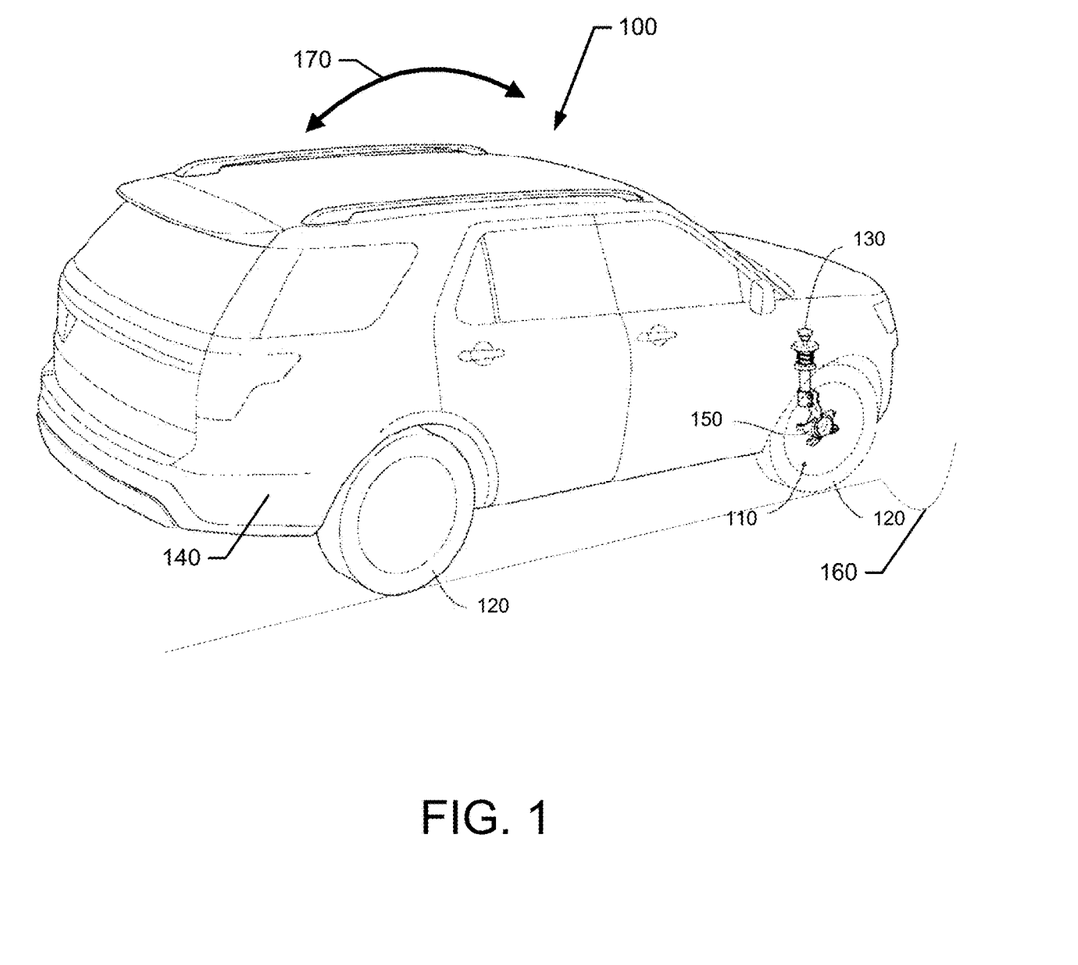
FIG. 1 illustrates a perspective view of a vehicle encountering an obstacle or rut and certain components of a suspension system of the vehicle in accordance with an example embodiment.

FIG. 1 illustrates a perspective of a vehicle 100 employing a suspension system 110 of an example embodiment. The suspension system 110 includes a plurality of wheels 120 in contact with the ground, and a damper 130 (e.g., a shock absorber or shock) disposed between each one of the wheels 120 and a body 140 or chassis of the vehicle 100. In some cases, the wheel 120 may be operably coupled to the damper 130 via a steering knuckle 150. Additional links may also be provided between the chassis and the steering knuckle 150 to stabilize the wheel 120, but such links are outside the scope of example embodiments.

As shown in FIG. 1, an obstacle 160, as one example of a feature in which the vehicle 100 may become stuck. Notably, although the obstacle 160 is shown as a depression in the otherwise smooth surface being traversed, it is also possible for the obstacle 160 to be an object extending out of the surface (e.g., a rock, boulder, dune, etc.) to be traversed with assistance from example embodiments. Moreover, although the obstacle 160 is shown already in existence, it is also entirely possible that the obstacle 160 is made by the vehicle 100. For example, the vehicle 100 may actually dig a hole, in which case the hole dug by the vehicle 100 becomes the obstacle 160.

Regardless of how the obstacle is formed, the body 140 of the vehicle 100 may tend to move up and down pitching as shown by double arrow 170 as the obstacle 160 is traversed. The pitching may correspondingly cause compression and extension of the damper 130 of the suspension system 110, as the damper 130 attempts to damp out the motion. Both the damper 130 and the wheel 120 have a limited amount of linear travel that is possible. Thus, when the obstacle 160 is encountered, the suspension system 110 of the vehicle 100 may go into droop as weight shifts and normal force at the tire contact patch of each corner also changes. If the normal force is reduced substantially, or even to zero in some cases, the vehicle 100 may become stuck in the obstacle 160 (e.g., the hole). Moreover, in some cases, the vehicle 100 may actually continue to dig the hole deeper instead of making any progress toward the free condition, where the vehicle 100 has traversed the hole and is making forward progress again.

Even in situations where the obstacle 160 is dug deep enough for the frame or body 140 of the vehicle 100 to contact the surface, techniques can still be employed to free the vehicle 100. Example embodiments provide options for taking action to avoid getting stuck, and to free the vehicle 100 in case the vehicle 100 nevertheless becomes stuck. Thus, to improve suspension performance, example embodiments may employ a suspension control system that enables the provision of options to the driver for avoiding getting stuck, or for getting unstuck, as noted above. The suspension control system may improve suspension performance by providing access to algorithms that strategically operate when actuated by the driver.

Figure 2:
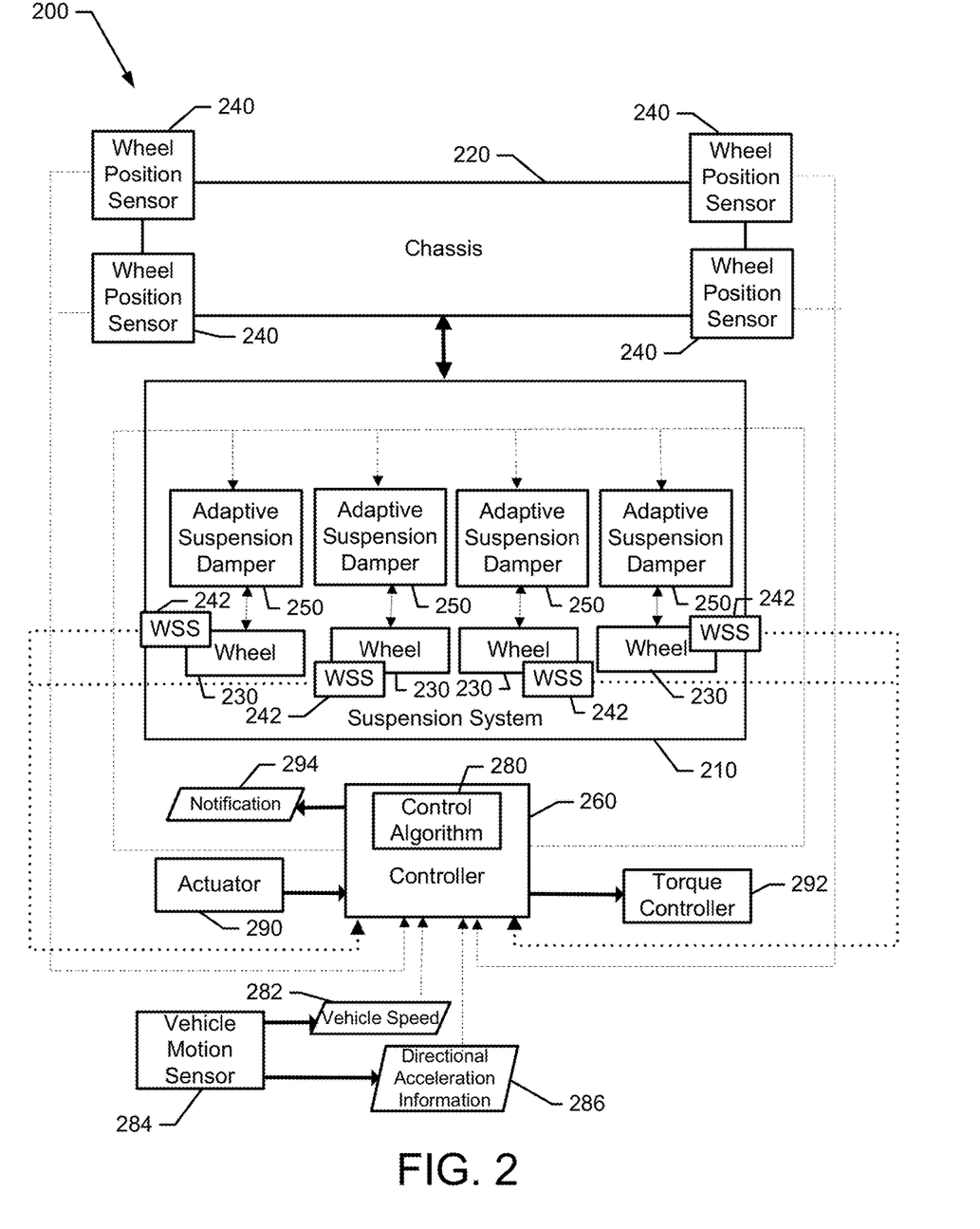
FIG. 2 illustrates a schematic diagram of a suspension system in accordance with an example embodiment.

FIG. 2 illustrates a block diagram of a vehicle 200 having an adaptive suspension system 210 in accordance with an example embodiment. As shown in FIG. 2, the adaptive suspension system 210 may operably couple a chassis 220 of the vehicle 200 to the ground. In this regard, the adaptive suspension system 210 may include wheels 230, wheel position sensors 240 (which could also or alternatively include ride height sensors, scales, etc., wherever mentioned hereinafter), wheel speed sensors (WSS) 242, and an adaptive suspension damper 250. One instance of each of the wheel position sensors 240 and wheel speed sensors 242 may be disposed at respective corners of the chassis 220 (e.g., a front right, front left, rear right, and rear left corner). The wheel position sensors 240, wheel speed sensors 242 and the adaptive suspension damper 250 may each be operably coupled to an electronic control unit (ECU) or other controller 260 of the vehicle 200.

In an example embodiment, the wheel position sensors 240 may include sensors for each respective one of the wheels 230. Thus, for example, there may be a front left, front right, rear left, and rear right ride height sensor among the wheel position sensors 240. Similarly, there may be a front left, front right, rear left, and rear right wheel speed sensor among the wheel speed sensors 242. Thus each individual corner or wheel may have corresponding wheel position information and/or wheel speed information associated therewith, and the wheel position information and/or wheel speed information may be updated in real time while the vehicle 200 is in operation.

The controller 260 (which may include processing circuitry including a processor and memory) may be operably coupled to an active element of the adaptive suspension damper 250 (e.g., solenoid or otherwise electrically operated control valves) to actuate the active element based on a control algorithm 280 stored at or accessible to the controller 260. Actuation of the active element may cause an increase or decrease (depending on the instruction from the control algorithm 280) in the damping force applied in the adaptive suspension damper 250. As noted above, the adaptability of the adaptive suspension damper 250 may be associated with spring rate (e.g., for air springs), or may be associated with the adding or reducing of fluid in various chambers of the adaptive suspension damper 250.

The controller 260 may be configured to receive wheel position information from each of the wheel position sensors 240 along with wheel speed information from each of the wheel speed sensors 242. The controller 260 may also receive vehicle speed information 282 from vehicle motion sensor 284 (e.g., one or more global positioning system (GPS) receivers, gyroscopes or accelerometers capable of measuring lateral, longitudinal and/or other accelerations of the vehicle 200). The vehicle motion sensor 284 may be a sensor or component of a vehicle sensor assembly, or may itself be an example of the vehicle sensor assembly.

In some embodiments, the controller 260 may (via the control algorithm 280) determine when a wheel is slipping based on the wheel speed information. In this regard, for example, if measured wheel speed of one wheel is greater than measured wheel speed of the other wheels by a threshold amount, the wheel with the higher speed may be determined to be slipping. Alternatively or additionally, if the measured wheel speed for a given wheel is greater than the vehicle speed 282 by a threshold amount, the given wheel may be determined to be slipping. For example, if vehicle speed 282 is very low (e.g., less than about 5 miles per hour (MPH)), but wheel speed is high, the speed difference may indicate that one (or more) of the wheels with a high wheel speed is spinning. In some cases, the controller 260 may further reference vehicle acceleration in lateral and/or longitudinal directions along with or as an alternative to wheel position measurements to determine droop conditions or suspension position. This information, which may be referred to as directional acceleration information 286 may also be provided by the vehicle motion sensor 284.

The wheel position sensors 240 may also or alternatively provide information that is indicative of the current ride height, loading or weight balance of the vehicle 200. Based on the current ride height, loading or weight balance of the vehicle 200, and based on which wheel is slipping, the controller 260 (again via the control algorithm) may employ strategies described below in association with the algorithms described herein to adjust the normal force at the tire contact patch to improve traction and avoid getting stuck, or get the vehicle 200 unstuck.

In an example embodiment, the control algorithm 280 may include a lookup table that defines different strategies for getting unstuck (e.g., individual different algorithms or sub-algorithms) that can be employed automatically. In some cases, the automatic employment of the strategies may nevertheless occur only when specifically requested by the driver. For example, an operable member or actuator 290 may be provided to receive continuous driver input indicating a desire for the automatic algorithms to continue to operate. When the actuator 290 is actuated, the automatic algorithms may cycle through usage until the vehicle 200 is unstuck. However, when the actuator 290 is released, the automatic algorithms may suspend operation, and control may return to normal methods and paradigms.

In an example embodiment, the control algorithm 280 (and any algorithms or sub-algorithms thereof) may have an input to the adaptive suspension damper 250 to change damping force applied therein. However, the control algorithm 280 may also interface with a torque controller 292 of the vehicle 200 to provide inputs for controlling the application of positive and/or negative torque at the wheels 230 (individually or in groups) of the vehicle 200. For a hybrid or battery electric vehicle, the torque controller 292 may provide positive and/or negative torque requests to the electric motors of the wheels 230 and/or brake systems again individually or in groups.

In some embodiments, the controller 260 may receive continued streams of data from all sensors in the suspension system 210 (including those shown in FIG. 2, and perhaps also others). Based on the data received, the controller 260 may attempt to determine a current state of the vehicle 200. In an example embodiment, the current state of the vehicle 200 may be a free condition where the vehicle 200 appears neither to be in a stuck condition nor the nearly stuck condition. Meanwhile the stuck condition may correspond to situations in which vehicle speed 282 is zero, or nearly so, with wheel speeds exceeding threshold limits. In some cases, cycling between forward and rearward motion (e.g., with corresponding cycles of upward and downward accelerations) may indicate that the vehicle 200 is in a hole and alternating between climbing a side of the hole and settling back down into the hole after being unable to climb out. In some embodiments, ranges for the differences in wheel speeds, the amounts of upward, downward, forward, and rearward acceleration, and changes in those parameters including trends in such changes may be used to define boundaries between the stuck condition, the nearly stuck condition, and the free condition.

In an example embodiment, whenever the vehicle 200 is in the free condition, the controller 260 may not employ interventions described herein, and vehicle 200 operation may essentially be considered "normal." However, when the nearly stuck condition or the stuck condition is detected, the controller 260 may (e.g., via execution of the control algorithm 280) provide a notification 294 to the driver. The notification 294 may be a visual, audible and/or haptic indication to the driver that the vehicle 200 is no longer in the free condition. In some cases, the notification 294 may be a light, icon, textual notice, buzz, beep, other sound, vibration or other haptic feedback that indicates that the vehicle 200 is no longer in the free condition. Moreover, in some cases, the notification 294 may be different in each of the stuck condition and the nearly stuck condition in order to differentiate between the two conditions.

In any case, upon receipt of the notification 294, the driver may be enabled to operate the actuator 290 in order to initiate further operation of the control algorithm 280 to implement algorithms to avoid getting stuck or get the vehicle 200 unstuck. The actuator 290 may be a single button, switch, pedal, etc., or may in some situations be a combination of two or more buttons, switches, pedals, or other input devices. For example, in some cases, the actuator 290 may include mode selector to select a mode for getting unstuck, and may further include an input controller (e.g., a button, pedal, or the like) that signals intent for continued operation of the algorithms to avoid getting stuck or get the vehicle 200 unstuck. In such examples, when a mode for getting unstuck is selected, the controller 260 may execute a series of additional algorithms or sub-algorithms of the control algorithm 280 to, for example, interface with the torque controller 292 to provide positive and/or negative torque inputs in amounts and sequences defined by the control algorithm 280. Changes to damping force via the adaptive suspension damper 250, connection or disconnection of the ARB, or other suspension system 210 changes may also or alternatively be applied by the control algorithm 280 as well. Calibration of component responses in such situations may be based on surface contour and/or available grip on each side or corner of the vehicle 200.

Figure 3A:
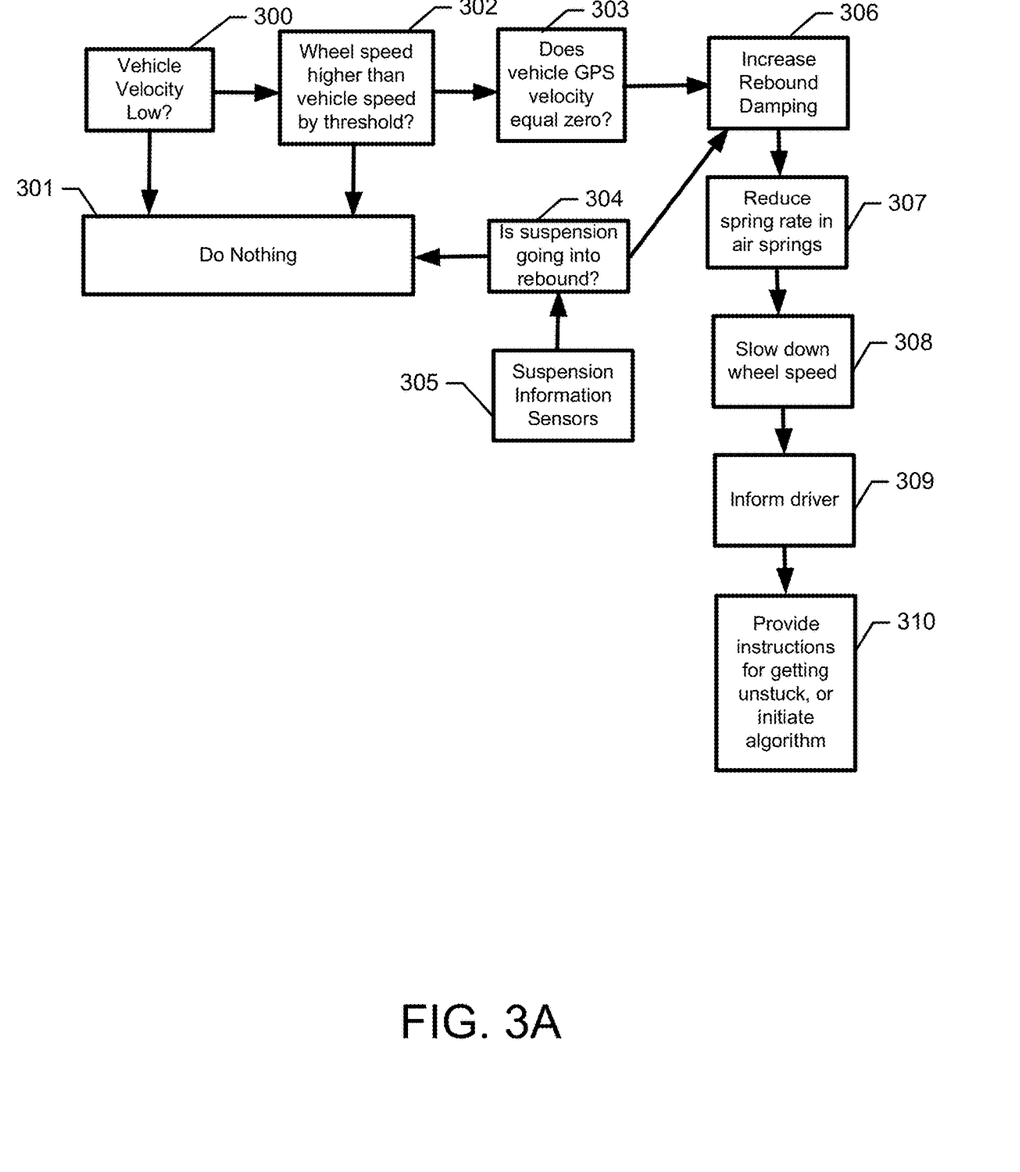
FIG. 3A illustrates a block diagram showing a potential solution for providing vehicle control according to an example embodiment.

FIG. 3A illustrates a block diagram showing a potential solution for providing vehicle control according to an example embodiment. In this regard, at operation 300 a determination may be made as to whether vehicle velocity is low (e.g., <5 miles per hour (MPH)). If not, then no action may be taken at operation 301. However, if vehicle velocity is low, then a determination may be made at operation 302 as to whether wheel speed is higher than vehicle speed by a calibrated value or threshold. If not, then no action may be taken at operation 301. However, if such a difference in speed exists, then a determination may be made as to whether measured vehicle velocity by combining wheel speed with an integration of longitudinal acceleration over time, GPS or other means is approximately zero at operation 303. If not, a determination may be made as to whether suspension is going into rebound thereby indicating that the body or frame has contacted the ground at operation 304. Operation 304 may be performed via suspension information sensors 305 such as onboard scales, ride height sensors, wheel position sensors, and/or the like. If not, then no action may be taken at operation 301.

If, however, there is a positive answer to either operation 303 or 304, then an increase in rebound damping to full authority may be provided at operation 306. This reaction may avoid wheels dropping into a cavity or rut that is being created in the surface. Additionally or alternatively, a reduction in spring rate may be made in air springs at operation 307. Such reduction may reduce the propensity to push the suspension into rebound. At operation 308, which may be an alternative or additional operation flowing from operations 305, 306 or 307, wheel speeds may be slowed down using traction control anti-lock brake system, stability control system, regenerative braking or the like at a slow but authoritative calibrated rate to avoid any negative effects on driveline components. At operation 309, the driver may be informed that the vehicle either is stuck, or is nearly stuck. Thereafter, at operation 310, instructions may be offered regarding how to get the vehicle unstuck. The instructions may include initiation of an unstuck algorithm (e.g., the control algorithm 280) or specific instructions for how to manipulate the wheel, control speed, or direct a shift into 4×4 low or other settings that may be helpful.

Figure 3B:
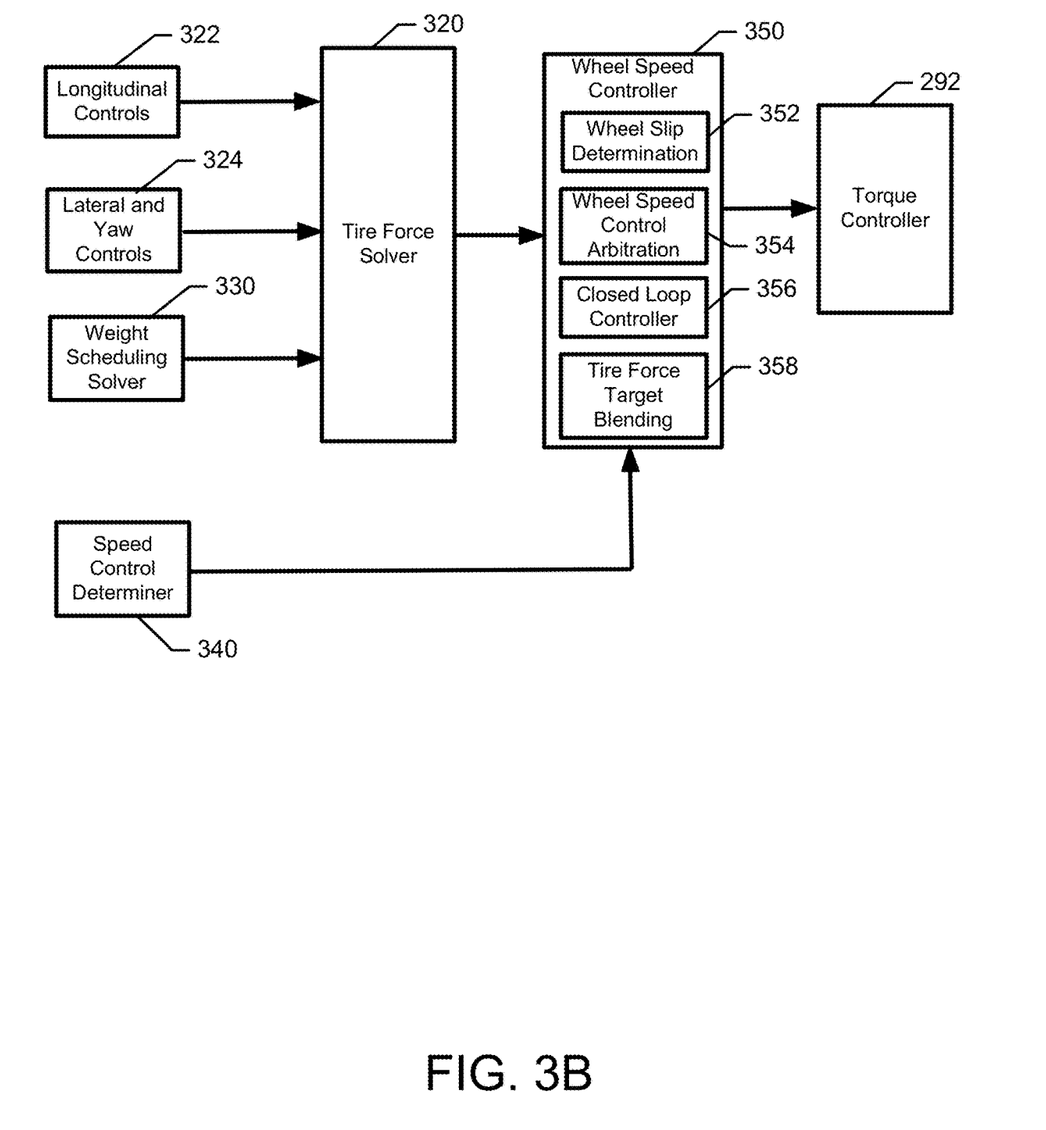
FIG. 3B illustrates a schematic diagram of components associated with executing an unstuck algorithm in accordance with an example embodiment.

In an example embodiment, the control algorithm 280 may include at least one additional algorithm or sub-algorithm for getting the vehicle 200 unstuck. Any such additional algorithm or sub-algorithm may therefore be considered to be an example of an "unstuck algorithm". The unstuck algorithm may be accessed or utilized when in an unstuck mode (e.g., responsive to the actuator 290 selecting a corresponding mode. In some embodiments, the unstuck algorithm may be a single function or single strategy control algorithm. For example, when actuated, the unstuck algorithm may simply reduce spring rate for vehicles equipped with air spring, increase or decrease damping force for the adaptive suspension damper 250, initiate traction control, coordinate torque application to one or more wheels at very slow wheel speed, correlate a pedal position (e.g., of the throttle) to a target slip or percent of slip to a reference speed to, for example, fling mud or slowly turn tires over in sand all based on throttle pedal position. However, in other embodiments, the unstuck mode and unstuck algorithms associated therewith may be multi-function and/or multi-strategy. FIG. 3B illustrates a schematic view of various features that may be associated with operation of an unstuck algorithm that employs multiple strategies in an intelligent way in accordance with an example embodiment.

Referring to FIG. 3B, the unstuck algorithm may operate in connection with the operation of a tire force solver 320. The tire force solver 320 may take inputs from longitudinal controls 322 and lateral and yaw controls 324. The longitudinal controls 322 may receive inputs from the vehicle motion sensor 284 relating to longitudinal direction accelerations or movements to define force requests for the x direction. The lateral and yaw controls 324 may receive inputs from the vehicle motion sensor 284 relating to lateral and up/down direction accelerations or movements to define force requests for the y and z directions. The force requests from the longitudinal controls 322 and the lateral and yaw controls 324 may all be processed at the tire force solver 320.

The tire force solver 320 may also receive input from a weight scheduling solver 330. The weight scheduling solver 330 may be configured to determine optimization function weights for the various requests received by the tire force solver 320. The tire force solver 320 may include tables or models configured to determine tire force target values for each tire or corner of the vehicle based on the force requests and weighting values received.

In an example embodiment, a speed control determiner 340 may be provided to define speed control flags, speed targets and wheel torque limits for the vehicle for each of the sub-algorithms employed within the unstuck algorithm that employs multiple strategies. In particular, the speed control determiner 340 may employ cycling functions associated with different strategies that may be tried in sequence in order to get a vehicle in the stuck condition unstuck. The cycling functions will be described in greater detail below in connection with FIG. 5. The tire force targets from the tire force solver 320, and the outputs of the speed control determiner 340 may be input into a wheel speed controller 350. The wheel speed controller 350 may determine arbitrated tire force targets that are communicated to the torque controller 292, which thereafter generates motor torque commands for inverters or individual wheel motors and as brake torque commands communicated to brakes or other negative torque generating components.

The wheel speed controller 350 may include a wheel slip determination engine 352, a wheel speed control arbitration engine 354, a closed loop controller 356, and a tire force target blending engine 358. The wheel slip determination engine 352, may determine wheel slip values associated with different strategies based on the tire force targets. The wheel speed control arbitration engine 354 may arbitrate conflicting wheel speed controls to determine one coherent output. The closed loop controller 356 may compare current values to target values to facilitate closing errors therebetween. The tire force target blending engine 358 may ultimately take all values provided by other components of the wheel speed controller 350 to generate the output for the torque controller 292.

In an example embodiment, vehicle specific information such as tire radius, and information indicative of pedal characteristics, propulsion and braking torque characteristics, and other basic structural or functional limitations or characteristics of the vehicle may be accounted for in tables or models used by the various components of the speed control determiner 340 and wheel speed controller 350. Meanwhile, the speed control determiner 340 of some embodiments may be configured to execute a multi-function or multi-modal unstuck algorithm. FIG. 5 illustrates an example of such an algorithm. However, prior to discussing the multi-function or multi-modal unstuck algorithm in greater detail, a look at the physics and practical issues at play when a vehicle is stuck may be instructive. A discussion of such issues in reference to FIG. 4 follows.

Figure 4:
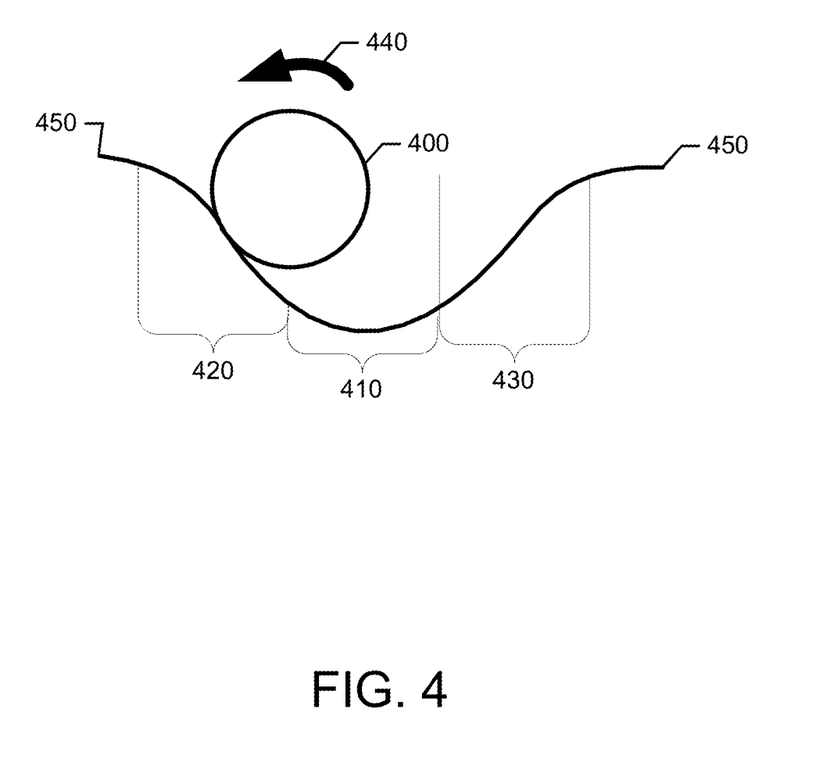
FIG. 4 illustrates a schematic side view of a wheel located in a rut in accordance with an example embodiment.
Figure 5:
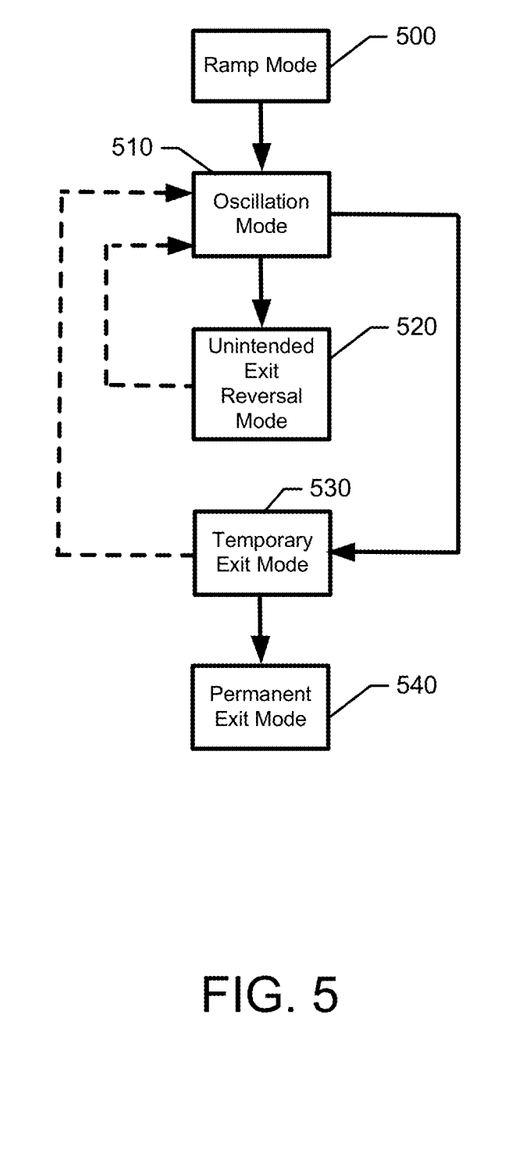
FIG. 5 is a block diagram of an unstuck algorithm in accordance with an example embodiment.

Referring to FIG. 4, a wheel 400 can be seen in a depression area 410 between a first incline area 420 and a second incline area 430. The depression area 410 may be a hole or rut, which may in some cases actually be dug by the wheel 400. In such a case, the first and second incline areas 420 and 430 may be sides of the hole or rut, and may actually move to widen apart or become closer together as the wheel 400 digs or moves material while trying to become released from the depression area 410. However, in other cases, the depression area 410 could simply be a low area between two obstacles or features such as rocks.

In the example shown, propulsive torque may be applied as the wheel 400 turns in direction 440. When the wheel 400 turns in a forward or desired traction direction, a reference velocity ($V_{ref}$) is established, where the reference velocity ($V_{ref}$) is the mean estimated vehicle velocity over the ground. Until a crest 450 after the first or second incline areas 420 and 430 is traversed, the possibility of slipping back into the depression area 410 remains. Thus, to escape from the depression area 410 an absolute value of a radius of the wheel ($R_{wh}$) times the angular velocity of the wheel ($\omega_{wh}$) needs to remain greater than an absolute value of the reference velocity ($V_{ref}$). In other words, $|R_{wh}\omega_{wh}| > |V_{ref}|$ and at the same time it is important to ensure that $(R_{wh}\omega_{wh} \cdot V_{ref}) > 0$. This ensures that traction ($F_t$) is in the same direction as the reference velocity ($V_{ref}$). Traction ($F_t$) works with gravity to increase acceleration while going down the rut in the reverse motion direction that is opposite the desired traction direction. Meanwhile, traction ($F_t$) fights gravity and reduces negative acceleration while going up the first and second incline areas 420 and 430.

When the component of gravitational force in the x direction (or forward direction, whereas the y direction is lateral, and the z direction is vertical) is greater than the maximum force available for tire coefficient of friction (i.e., tire Mu), the vehicle will tend to slow down. If the force of propulsion available for tire Mu is sufficient while climbing the first or second incline areas 420 or 430, the wheel 400 may escape over the crest 450. Thus, for example, in a first phase of attempting to escape from the depression area 410, traction may be available within the depression area 410 as the bottom of this region may be partly flat, or at least have a low slope. In the depression area 410, a target speed may therefore be set by a mode of the multi-function or multi-modal unstuck algorithm to lead the reference velocity ($V_{ref}$) in phase. Meanwhile, when entering into either the first or second incline areas 420 and 430, gravitation force will be related to the maximum force available for tire Mu. Momentum, which may be built from rocking or cycling back and forth between the forward direction and reverse direction, must be built to overcome the slope and escape from the first and second incline areas 420 and 430. Within this region, the target speed may be set to lead or be phase aligned with the reference velocity ($V_{ref}$). Finally, target speed for attempting to escape a rut (e.g., the depression area 410) immediately prior to reaching the crest 450 (i.e., where the slope reduces from that of the first and second incline areas 420 and 430) should generally lag the reference velocity ($V_{ref}$).

As can be appreciated from the descriptions above, controlling rocking back and forth, thereby using momentum strategically, an escape may be accomplished. The multi-function or multi-modal unstuck algorithm employs a series of different strategies to attempt to escape. Referring now to FIG. 5, a series of five different sub-algorithms of a multi-function or multi-modal unstuck algorithm is illustrated. Each of the sub-algorithms may be cycled through automatically by the controller 260 (e.g., via speed control determiner 340) during execution of the control algorithm 280 until execution thereof is stopped. In an example embodiment, each individual one of the sub-algorithms may have corresponding entry conditions and exit conditions that may govern the automated control flow through the sub-algorithms. In this regard, for example, entry conditions satisfied for one sub-algorithm may cause the corresponding sub-algorithm to fire when exit conditions for a preceding sub-algorithm have been met to end operation within the preceding sub-algorithm. The entry conditions, exit conditions, and general operation of each sub-algorithm in accordance with one example will be described in greater detail below.

As shown in FIG. 5, the sub-algorithms may include a ramp mode 500, an oscillation mode 510, an unintended exit reversal mode 520, a temporary exit mode 530, and a permanent exit mode 540. The ramp mode 500 may be a mode (or strategy) within the multi-function or multi-modal unstuck algorithm in which a speed target increases until acceleration (i.e., longitudinal acceleration) peaks (e.g., jerk=0) to define a measurable phenomenon (or disturbance) that provides the energy needed to start oscillation and create a defined acceleration over noise. The ramp mode provides a linear increase in speed as the speed target ramps up until implied tire force is less than the gravitational force due to the slope of the rut. In some cases, operation of the pedal (e.g., a percentage of pedal depression relative to a full range of pedal travel) may increase ramp speed. The ramp up continues until a filtered jerk estimate (e.g., an estimated peak acceleration) reaches a calibrated threshold. When the calibrated threshold is reached, the current speed target is set to zero and control is passed to the oscillation mode 510.

In an example embodiment, entry conditions for entering the ramp mode 500 may be appreciated to include a low speed (or zero speed). Another entry condition may be the selection of the multi-function or multi-modal unstuck algorithm (e.g., at a human machine interface (HMI) or other user interface of the vehicle 200). Finally, actuation of the actuator 290 (which may be the accelerator pedal in some cases) must be maintained to allow the continued operation of the ramp mode 500. Exit conditions from the ramp mode 500 may include detection of a peak in longitudinal acceleration, which indicates a stall at a portion of the first or second incline area 520 or 530. Notably, the actuator 290 must be maintained actuated to allow the transition from the ramp mode 500 to the oscillation mode 510.

The oscillation mode 510 may have entry conditions that include a flag from the ramp mode 500 (e.g., indicating that peak acceleration was measured). As noted above, the actuator 290 must be maintained actuated to allow the transition from the ramp mode 500 to the oscillation mode 510 so actuation of the actuator 290 may be another entry condition. Meanwhile, exit conditions include matching entry conditions for either the unintended exit reversal mode 520 or the temporary exit mode 530.

Figure 6:
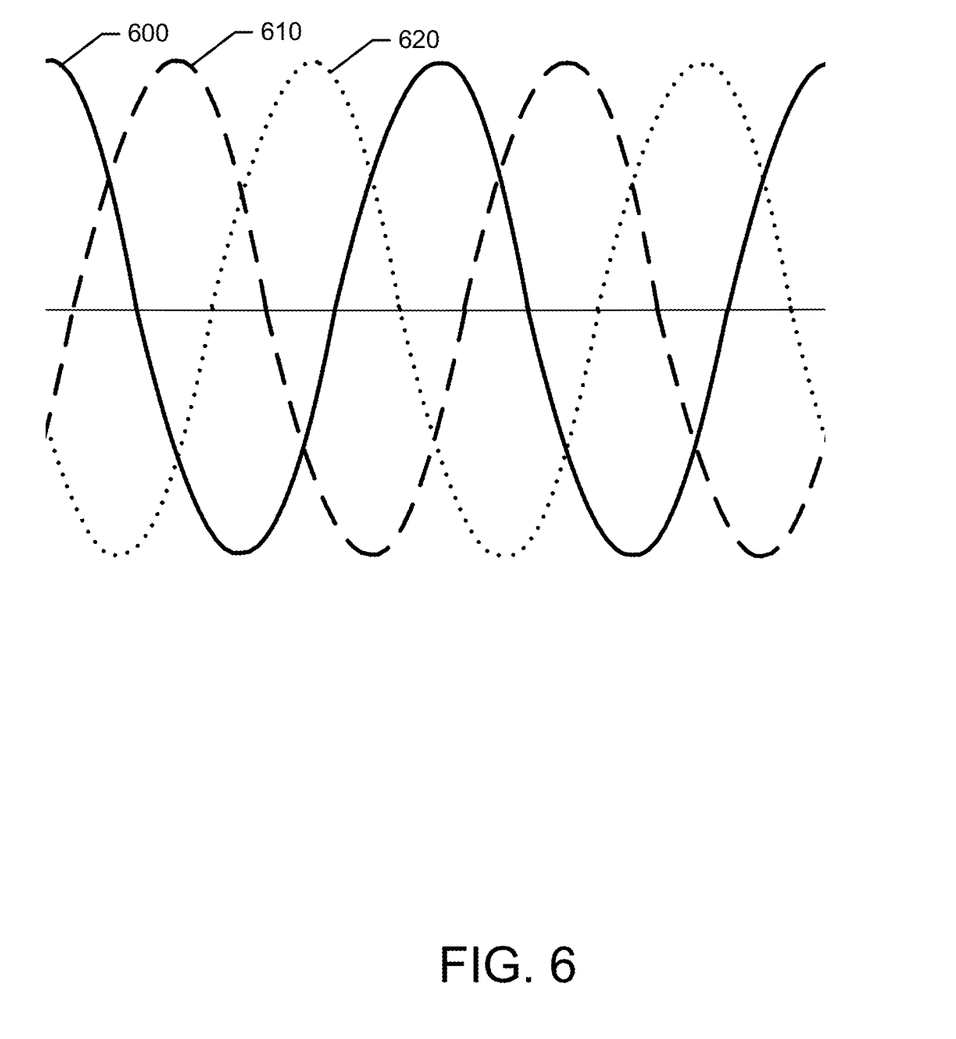
FIG. 6 is a plot of velocity curves generated in accordance with an example embodiment.

In the oscillation mode 510, longitudinal acceleration and a delayed velocity estimate are linearly combined with gains that adjust based on how peak velocity is changing. In some cases, the velocity estimate may have a steady state offset and linear bias removed so that the velocity estimate includes only medium to high frequency sinusoidal content centered around zero. Gains for a longitudinal acceleration based speed target may start higher to ensure that the speed target leads vehicle velocity and forces resonance as shown in FIG. 6. In this regard, FIG. 6 shows a longitudinal acceleration based speed target 600 with a corresponding gain referred to as $k_a$. True vehicle velocity 610 is shown in a long dashed line, and an estimate of delayed velocity 620 (shown with a dotted line) with bias removed and delay added has a gain referred to as $k_a$. The proportion of the delayed velocity 620 signal increases as momentum builds to phase align the target with the true vehicle velocity 610.

In some embodiments, the longitudinal acceleration signal may be high pass filtered with grade removed, and the remainder may be integrated to determine an initial estimated reference velocity. The initial estimated reference velocity may then be passed a high pass filter stage to remove linear biases. Steady state bias introduced from previous filter stages may then be subtracted via a second high pass filter. Thereafter a simple delay may be added to counteract the phase advance created by the two high pass filter stages. A result of this processing may be considered to be an adjusted reference velocity.

In some cases, an internal reference velocity calculation may be affected by any inherent offset in a longitudinal acceleration ($a_{long}$) sensor or errors in grade calculations may show up as a bias increasing with time. The reference velocity may therefore oscillate about a non-zero center value and keep moving away from zero over time. Thus, the bias may need to be corrected before the reference velocity can be used to determine a term corresponding to the reference velocity adjusted by the gain $k_v$, e.g., as $k_v \cdot V_{ref}$. In order to correct this value, a sign of a jerk calculation ($\dot{a}_{long}$) may be used to determine a non-zero crossing of the internal reference velocity. Thus, for example, a zero-crossing of the $\dot{a}_{long}$ may correspond with a zero-crossing of the internal reference velocity. The reference velocity calculation may therefore be instantly adjusted to zero at each such instant. Other approaches to generating the adjusted reference velocity may alternatively be employed in some cases.

The oscillation mode 510 may effectively be considered to be a peak tracking algorithm. In this regard, the oscillation mode 510 may seek to calculate and track an amplitude of oscillations associated with rocking the vehicle back and forth. To do so, the oscillation mode 510 may determine instants when the internal reference velocity crosses either a maximum or minimum peak. A difference (e.g., $\Delta V_{ref}$) may be determined between extremum associated with these peaks. A mean of the last to calculations of this difference (e.g., $\Delta V_{ref}$) may be a metric for amplitude. Thus, the oscillation mode 510 may calculate a difference between the last two reference velocity amplitude values under this definition. Gains $k_a$ and $k_v$, are then changed based on the change in the amplitude metric. By relying on consecutive peaks, the effects of long-term bias in the reference velocity calculations may be reduced. In effect, the oscillation mode 510 may provide a way to select and optimize a target value based on the longitudinal acceleration of the vehicle by creating a disturbance or signal that can be tracked and monitored to provide needed information in an otherwise noisy signal environment. The oscillation mode 510 therefore provides an adjustment to the speed target on the fly based on determining how the vehicle responds to the algorithm.

The unintended exit reversal mode 520 may have an entry condition that includes a measurement of distance moved in a rut being greater than a threshold amount in the reverse direction when operating in the oscillation mode 510. In this regard, for example, when a distance traveled exceeds a calibrated threshold in reverse (i.e., moving in a direction opposite the direction of intended travel), control may be passed from the oscillation mode 510 to the unintended exit reversal mode 520. Meanwhile, exit conditions for the unintended exit reversal mode 520 may include release of the actuator 290, or achieving a speed in the reverse direction (i.e., the direction opposite the direction of intended travel) that exceeds a threshold thereby indicating that the vehicle (or wheel 400) is out of the rut moving in the reverse direction. The unintended exit reversal mode 520 may provide that a speed target becomes a scalar multiple of pedal operation (e.g., pedal percent depression) in the intended exit direction to reverse course. Control may be handed back to the oscillation mode 510 once vehicle speed crosses a threshold that shows that direction has changed.

The temporary exit mode 530 may have entry conditions that include a measurement of distance moved in a rut being greater than a threshold amount in the intended direction when operating in the oscillation mode 510. In this regard, distance is calculated by integrating the reference velocity ($V_{ref}$). Every time the vehicle pauses at the top of the rut, the relative distance traveled since the last such pause is reset. There may be multiple options for finding a zero point for the true reference velocity including, for example, using a zero point of the adjusted reference velocity, or using a first instance of jerk=0 after the longitudinal acceleration changes sign. When the distance traveled exceeds a distance threshold, an exit flag may be triggered or latched until the vehicle has slid back into the rut by another calibrated distance. When the exit flag is set (or indicates true), control may be passed to a speed control mode, which will pass control to a torque control mode if torques are high enough. If the vehicle continues to gain distance and speed, the permanent exit mode may be triggered. Thus, exit conditions may include velocity exceeding a speed value that indicates that the vehicle is out of the rut (which will send the vehicle to the permanent exit mode 540), or an indication that the vehicle has not made it out of the rut. Of course, any release of the actuator 290 would also be an exit condition.

The permanent exit mode 540 may, as noted above, be entered from the temporary exit mode 530 when a velocity of the vehicle exceeds a threshold. Exit conditions include release of the actuator 290, or an exit from the rut, at which point regular vehicle operation should be restored (e.g., from a stopped condition). The permanent exit mode 540 may latch the exit flag so that further rock cycling is blocked until the brakes are applied and reference velocity and pedal depression are each at zero. This provides a condition from which a return to normal operation can be accomplished. The driver may then exit the unstuck mode (and turn off the unstuck algorithm). However, operation with the mode enabled is also possible. In some embodiments, saturation and rate limiting may be applied to final speed commands. In this regard, dynamic saturation may be provided to limit wheel slip. Limits on the speed command may therefore be set based on pedal position and the current reference velocity. Given that a high wheel slip may lead to reduced traction, a slip window may be defined with increasingly tighter tolerances as confidence in estimated reference velocity grows and the number of oscillations also grows. Rate limits may be provided with respect to motor acceleration (positive and negative) rates.

Figure 7:
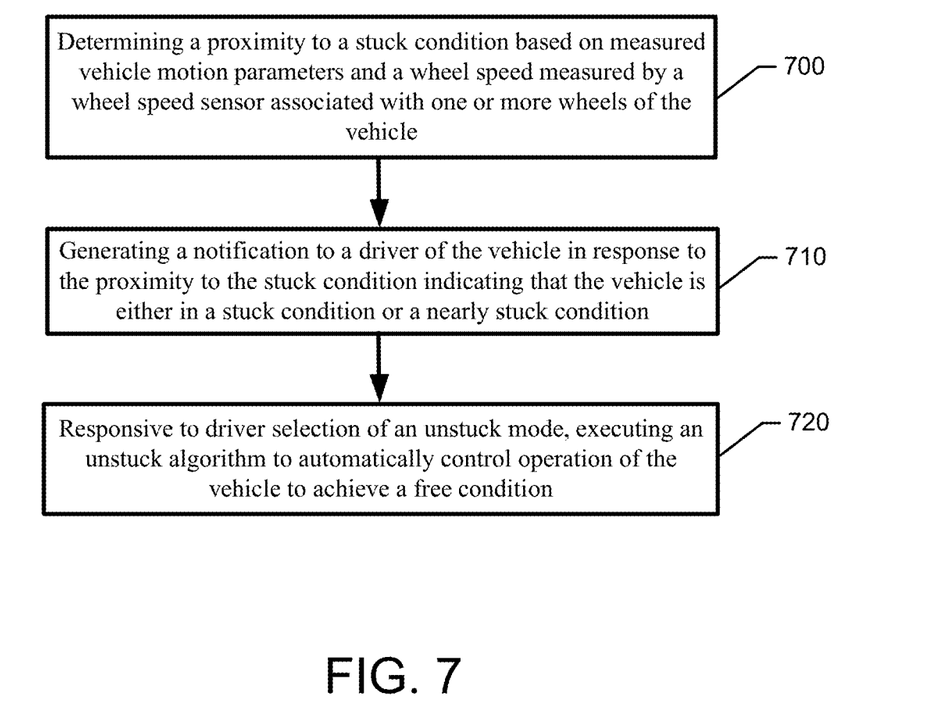
FIG. 7 is a block diagram of a method of controlling a vehicle in accordance with an example embodiment.

FIG. 7 illustrates a block diagram of a method of controlling a vehicle in accordance with an example embodiment. The method may include determining a proximity to a stuck condition based on measured vehicle motion parameters and a wheel speed measured by a wheel speed sensor associated with one or more wheels of the vehicle at operation 700. The method may further include generating a notification to a driver of the vehicle in response to the proximity to the stuck condition indicating that the vehicle is either in a stuck condition or a nearly stuck condition at operation 710, and responsive to driver selection of an unstuck mode, executing an unstuck algorithm to automatically control operation of the vehicle to achieve a free condition at operation 720.

The method of some embodiments (or the system comprising components that perform the method) may include additional features, modifications, augmentations and/or the like to achieve further objectives or enhance performance of the system. The additional features, modifications, augmentations and/or the like may be added in any combination with each other. Below is a list of various additional features, modifications, and augmentations that can be added individually or in any combination with each other. For example, generating the notification may include informing the driver of an automatic response initiated in response to the proximity to the stuck condition indicating that the vehicle is in a nearly stuck condition. In an example embodiment, the system may further include a suspension position sensor, and the automatic response may include initiating a change to a suspension component based on suspension information provided by the suspension position sensor. In some cases, the change to the suspension component may include connecting or disconnecting an anti-roll bar (ARB), changing a suspension damping force of an adaptive suspension damper, or increasing a spring rate of air springs. In an example embodiment, the unstuck mode may enable operation of a multi-modal algorithm in which each mode employs a different strategy for advancing the vehicle to the free condition while an actuator remains actuated. In some cases, the multi-modal algorithm may include a first mode that determines, based on measured longitudinal acceleration, when the vehicle is stalled at an incline of a rut. In an example embodiment, determining the vehicle is stalled may cause a transition to a second mode, the second mode determining and tracking an amplitude of oscillation of a reference velocity of the vehicle in alternating forward and reverse directions. In some cases, the second mode may determine the reference velocity based on filtering and integrating a longitudinal acceleration value measured by the vehicle sensor assembly. In an example embodiment, the filtering may include high pass filtering, and the second mode may include delaying an output of the filtering to counteract a phase advance created by the filtering. In some cases, a third mode may be entered responsive to distance moved in the rut being greater than a first threshold in an unintended direction of travel, and a fourth mode may be entered responsive to the distance moved in the rut being greater than a second threshold in an intended direction of travel. In an example embodiment, the fourth mode may cause a return to the second mode in response to the vehicle being unable to exit the rut, and may cause transition to a fifth mode responsive to velocity of the vehicle exceeding a third threshold. In some cases, the fifth mode may require vehicle speed to be zero, accelerator pedal to be released and brake force to be applied to return the vehicle to normal control. In an example embodiment, the third mode may operate to switch speed of the vehicle to be applied in the intended direction of travel. In some cases, the multi-modal algorithm may perform an estimate of velocity that is linearly combined with one or more gain values that are dynamically adjusted based on a change in peak velocity. In an example embodiment, the multi-modal algorithm may include a plurality of modes that automatically transition between each other responsive to corresponding entry and exit conditions being met until the free condition is achieved, or the actuator is released. In some cases, the proximity to the stuck condition may be determined based on comparing the wheel speed to vehicle speed or detecting wheel position relative to a range of possible wheel positions at a corresponding corner of the vehicle. In an example embodiment, generating the notification may include notifying the driver of an automated response to the vehicle being in the stuck condition or the nearly stuck condition, or recommending the driver to initiate selection of the unstuck mode.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although That which is claimed:

1. A vehicle control system comprising:
a vehicle sensor assembly measuring vehicle motion parameters;
a wheel speed sensor associated with one or more wheels of the vehicle to determine a wheel speed of each of the one or more wheels;
a controller operably coupled to the vehicle sensor assembly and the wheel speed sensor to:
determine a proximity to a stuck condition based on the vehicle motion parameters and the wheel speed;
generate a notification to a driver of the vehicle in response to the proximity to the stuck condition indicating that the vehicle is either in a stuck condition or a nearly stuck condition; and
responsive to driver selection of an unstuck mode, automatically and without driver interaction, cycle through execution of a multi-modal algorithm in which each mode of the multi-modal algorithm employs, when executed, a different strategy for advancing the vehicle to a free condition while an actuator remains actuated.

2. The system of claim 1, wherein generating the notification comprises informing the driver of an automatic response initiated in response to the proximity to the stuck condition indicating that the vehicle is in a nearly stuck condition.

3. The system of claim 2, further comprising a suspension position sensor,
wherein the automatic response comprises initiating a change to a suspension component based on suspension information provided by the suspension position sensor.

4. The system of claim 3, wherein the change to the suspension component comprises connecting or disconnecting an anti-roll bar (ARB).

5. The system of claim 3, wherein the change to the suspension component comprises changing a suspension damping force of an adaptive suspension damper.

6. The system of claim 1, wherein the multi-modal algorithm includes a first mode that determines, based on measured longitudinal acceleration, when the vehicle is stalled at an incline of a rut.

7. The system of claim 6, wherein determining the vehicle is stalled causes a transition to a second mode, the second mode determining and tracking an amplitude of oscillation of a reference velocity of the vehicle in alternating forward and reverse directions.

8. The system of claim 7, wherein the second mode determines the reference velocity based on filtering and integrating a longitudinal acceleration value measured by the vehicle sensor assembly.

9. The system of claim 8, wherein the filtering comprises high pass filtering, and wherein the second mode includes delaying an output of the filtering to counteract a phase advance created by the filtering.

10. The system of claim 7, wherein a third mode is entered responsive to distance moved in the rut being greater than a first threshold in an unintended direction of travel, and wherein a fourth mode is entered responsive to the distance moved in the rut being greater than a second threshold in an intended direction of travel.

11. The system of claim 10, wherein the fourth mode causes a return to the second mode in response to the vehicle being unable to exit the rut, and causes transition to a fifth mode responsive to velocity of the vehicle exceeding a third threshold.

12. The system of claim 11, wherein the fifth mode requires vehicle speed to be zero, accelerator pedal to be released and brake force to be applied to return the vehicle to normal control.

13. The system of claim 10, wherein the third mode operates to switch speed of the vehicle to be applied in the intended direction of travel.

14. The system of claim 1, wherein the multi-modal algorithm performs an estimate of velocity that is linearly combined with one or more gain values that are dynamically adjusted based on a change in peak velocity.

15. The system of claim 1, wherein the multi-modal algorithm comprises a plurality of modes that automatically transition between each other responsive to corresponding entry and exit conditions being met until the free condition is achieved, or the actuator is released.

16. The system of claim 1, wherein the proximity to the stuck condition is determined based on comparing the wheel speed to vehicle speed or detecting wheel position relative to a range of possible wheel positions at a corresponding corner of the vehicle.

17. The system of claim 1, wherein generating the notification comprises notifying the driver of an automated response to the vehicle being in the stuck condition or the nearly stuck condition, or recommending the driver to initiate selection of the unstuck mode.

18. A vehicle control system comprising:
a vehicle sensor assembly measuring vehicle motion parameters;
a wheel speed sensor associated with one or more wheels of the vehicle to determine a wheel speed of each of the one or more wheels;
a controller operably coupled to the vehicle sensor assembly and the wheel speed sensor to:
determine a proximity to a stuck condition based on the vehicle motion parameters and the wheel speed;
generate a notification to a driver of the vehicle in response to the proximity to the stuck condition indicating that the vehicle is either in a stuck condition or a nearly stuck condition; and
responsive to driver selection of an unstuck mode, execute an unstuck algorithm to automatically control operation of the vehicle to achieve a free condition,
wherein generating the notification comprises informing the driver of an automatic response initiated in response to the proximity to the stuck condition indicating that the vehicle is in a nearly stuck condition,
wherein the system further comprises a suspension position sensor,
wherein the automatic response comprises initiating a change to a suspension component based on suspension information provided by the suspension position sensor, and
wherein the change to the suspension component comprises connecting or disconnecting an anti-roll bar (ARB) or increasing a spring rate of air springs.

19. A method of controlling a vehicle comprising:
determining a proximity to a stuck condition based on measured vehicle motion parameters and a wheel speed measured by a wheel speed sensor associated with one or more wheels of the vehicle;
generating a notification to a driver of the vehicle in response to the proximity to the stuck condition indicating that the vehicle is either in a stuck condition or a nearly stuck condition; and responsive to driver selection of an unstuck mode, automatically and without driver interaction, cycling through execution of a multi-modal algorithm in which each mode of the multi-modal algorithm employs, when executed, a different strategy for advancing the vehicle to a free condition while an actuator remains actuated.

* * * * *